(12) United States Patent
Wu

(10) Patent No.: US 11,917,343 B2
(45) Date of Patent: Feb. 27, 2024

(54) IMAGE PROCESSING METHOD, IMAGE PROCESSING DEVICE, DISPLAY DEVICE, AND STORAGE MEDIUM

(71) Applicant: BOE TECHNOLOGY GROUP CO., LTD., Beijing (CN)

(72) Inventor: Yanhong Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 141 days.

(21) Appl. No.: 17/767,069

(22) PCT Filed: May 25, 2021

(86) PCT No.: PCT/CN2021/095652
§ 371 (c)(1),
(2) Date: Apr. 7, 2022

(87) PCT Pub. No.: WO2022/001490
PCT Pub. Date: Jan. 6, 2022

(65) Prior Publication Data
US 2022/0385872 A1 Dec. 1, 2022

(30) Foreign Application Priority Data

Jun. 28, 2020 (CN) .......................... 202010600749.5

(51) Int. Cl.
*H04N 9/73* (2023.01)
*G09G 5/02* (2006.01)

(52) U.S. Cl.
CPC ................. *H04N 9/73* (2013.01); *G09G 5/02* (2013.01)

(58) Field of Classification Search
None
See application file for complete search history.

(56) References Cited

U.S. PATENT DOCUMENTS

| 7,623,160 | B2 | 11/2009 | Chino et al. |
| 2016/0293121 | A1* | 10/2016 | Zeng .................... G09G 3/3611 |
| 2018/0288382 | A1 | 10/2018 | Kring |

FOREIGN PATENT DOCUMENTS

| CN | 101448171 A | 6/2009 |
| CN | 104715701 A | 6/2015 |

(Continued)

OTHER PUBLICATIONS

First Office Action of the corresponding CN202010600749.5 and search report.

(Continued)

*Primary Examiner* — Mark T Monk
(74) *Attorney, Agent, or Firm* — Chiwin Law LLC

(57) ABSTRACT

The present disclosure provides an image processing method, an image processing device, a display device, and a storage medium. The image processing method is suitable for processing an image to be processed to obtain a target image, image data of the image to be processed includes a gray-scale value corresponding to each basic color component of a plurality of basic color components. The image processing method includes: determining a target color temperature; determining a target value of each basic color component corresponding to the target color temperature; determining a transformation parameter of each basic color component according to the target value of each basic color component; and based on the transformation parameter of each basic color component, performing a transformation operation on the gray-scale value, corresponding to each basic color component, in the image data of the image to be processed to obtain image data of the target image.

20 Claims, 7 Drawing Sheets

(56) References Cited

FOREIGN PATENT DOCUMENTS

| | | | |
|---|---|---|---|
| CN | 104835455 | A | 8/2015 |
| CN | 106057169 | A | 10/2016 |
| CN | 106296746 | A | 1/2017 |
| CN | 107045416 | A | 8/2017 |
| CN | 108345439 | A | 7/2018 |
| CN | 109801603 | A | 5/2019 |
| CN | 110012278 | A | 7/2019 |
| CN | 110688599 | A | 1/2020 |
| JP | 2007074299 | A | 3/2007 |

OTHER PUBLICATIONS

Mitchell Charity, "Blackbody Color Datafile", http://www.vendian.org/mnchrity/dir3/blackbody/ Jun. 22, 2021.
Mitchel Charity, "Blackbody Colors Choosing Parameters", www.vendian.org/mncharity/dir3/blackbody/parameters, Nov. 11, 2002.

* cited by examiner

IMAGE PROCESSING METHOD, IMAGE PROCESSING DEVICE, DISPLAY DEVICE, AND STORAGE MEDIUM

This application is a U.S. National Phase Entry of International Application No. PCT/CN2021/095652 filed on May 25, 2021, designating the United States of America and claiming priority to Chinese Patent Application No. 202010600749.5, filed on Jun. 28, 2020. The present application claims priority to and the benefit of the above-identified applications and the above-identified applications are incorporated by reference herein in their entirety.

TECHNICAL FIELD

The embodiments of the present disclosure relate to an image processing method, an image processing device, a display device, and a storage medium.

BACKGROUND

With the popularity of smart devices, such as mobile phones and tablet computers, people spend most of their leisure time on these smart devices, use these smart devices to surf the Internet, play games, watch TV dramas, read novels, and so on. However, if you stare at a display screen of the smart device for a long time, it will cause eye fatigue. More seriously, the light emitted by the display screen contains blue light, and modern medical research shows that the blue light is very harmful to the eyes. Long-term exposure of the eyes to the blue light may cause irreversible damage to the eyes, such as causing eye diseases and the like.

SUMMARY

At least one embodiment of the present disclosure provides an image processing method, suitable for processing an image to be processed to obtain a target image, image data of the image to be processed comprises a gray-scale value corresponding to each basic color component of a plurality of basic color components, the image processing method comprises: determining a target color temperature; determining a target value of each basic color component corresponding to the target color temperature; determining a transformation parameter of each basic color component according to the target value of each basic color component; and based on the transformation parameter of each basic color component, performing a transformation operation on the gray-scale value, corresponding to each basic color component, in the image data of the image to be processed to obtain image data of the target image.

For example, in the image processing method provided by some embodiments of the present disclosure, determining the target color temperature comprises: acquiring an adjustment parameter; and determining the target color temperature according to the adjustment parameter.

For example, in the image processing method provided by some embodiments of the present disclosure, a value range of the adjustment parameter is [0, 1].

For example, in the image processing method provided by some embodiments of the present disclosure, determining the target color temperature according to the adjustment parameter comprises: calculating the target color temperature based on a color temperature determination formula, the color temperature determination formula is expressed as:

$$Temp = Tc\_min + (Tc\_max - Tc\_min) * ratio,$$

where Temp represents the target color temperature, ratio represents the adjustment parameter, Tc_min represents a first basic color temperature, Tc_max represents a second basic color temperature, and the first basic color temperature is lower than the second basic color temperature.

For example, in the image processing method provided by some embodiments of the present disclosure, the first basic color temperature Tc_min and the second basic color temperature Tc_max satisfy: 1900K<Tc_min<Tc_max<6600K.

For example, in the image processing method provided by some embodiments of the present disclosure, a value range of the first basic color temperature Tc_min is [2000K, 2500K], and a value range of the second basic color temperature Tc_max is [5000K, 6500K].

For example, in the image processing method provided by some embodiments of the present disclosure, the plurality of basic color components comprise three basic color components and the three basic color components comprise a red component, a green component, and a blue component.

For example, in the image processing method provided by some embodiments of the present disclosure, determining the target value of each basic color component corresponding to the target color temperature comprises: determining the target value of each basic color component corresponding to the target color temperature according to a functional relation between each basic color component and a color temperature, the functional relation between each basic color component and the color temperature is:

$$Fi(x) = Ai * \log(x/100 + Bi) + Ci,$$

where Fi(x) represents a value of each basic color component, x represents the color temperature, and values of parameters Ai, Bi, and Ci are obtained by fitting a plurality of coordinate points, between the first basic color temperature Tc_min and the second basic color temperature Tc_max, of a color matching function of each basic color component by using the functional relation, i=1 corresponds to the red component, i=2 corresponds to the green component, and i=3 corresponds to the blue component.

For example, in the image processing method provided by some embodiments of the present disclosure, determining the target value of each basic color component corresponding to the target color temperature comprises: determining the target value of each basic color component corresponding to the target color temperature according to a functional relation between each basic color component and a color temperature, a first functional relation between the red component and the color temperature is:

$$F1(x) = A1 * \log(x/100) + C1,$$

where F1(x) represents a value of the red component, x represents the color temperature, and values of parameters A1 and C1 are obtained by fitting a plurality of coordinate points, between the first basic color temperature Tc_min and the second basic color temperature Tc_max, of a color matching function of the red component by using the first functional relation; a second functional relation between the green component and the color temperature is:

$$F2(x) = A2 * \log(x/100) + C2,$$

where F2(x) represents a value of the green component, x represents the color temperature, and values of parameters A2 and C2 are obtained by fitting a plurality of coordinate points, between the first basic color temperature Tc_min and the second basic color temperature Tc_max, of a color matching function of the green component by using the second functional relation; and a third functional relation between the blue component and the color temperature is:

$$F3(x) = A3 * \log(x/100-10) + C3,$$

where F3(x) represents a value of the blue component, x represents the color temperature, and values of parameters A3 and C3 are obtained by fitting a plurality of coordinate points, between the first basic color temperature Tc_min and the second basic color temperature Tc_max, of a color matching function of the blue component by using the third functional relation.

For example, in the image processing method provided by some embodiments of the present disclosure, determining the target value of each basic color component corresponding to the target color temperature according to the functional relation between each basic color component and the color temperature, comprises: calculating the target value of each basic color component corresponding to the target color temperature based on a target value determination formula, the target value determination formula is expressed as:

$$Ti = \max(\min(Fi(\text{Temp}), G\ \max), 0),$$

where Ti represents the target value of each basic color component corresponding to the target color temperature, Fi( ) represents the functional relation between each basic color component and the color temperature, i=1, 2, 3, Temp represents the target color temperature, G max represents a maximum value in a value range of the gray-scale value of each basic color component, min( ) represents a function that takes a minimum value, and max( ) represents a function that takes a maximum value.

For example, in the image processing method provided by some embodiments of the present disclosure, determining the transformation parameter of each basic color component according to the target value of each basic color component, comprises: calculating the transformation parameter of each basic color component based on a transformation parameter determination formula of each basic color component, the transformation parameter determination formula of each basic color component is expressed as:

$$\text{ratio\_}Ti = Ti/G\ \max,$$

where ratio_Ti represents the transformation parameter of each basic color component, and i=1, 2, 3.

For example, in the image processing method provided by some embodiments of the present disclosure, based on the transformation parameter of each basic color component, performing the transformation operation on the gray-scale value, corresponding to each basic color component, in the image data of the image to be processed to obtain the image data of the target image, comprises: calculating a gray-scale value corresponding to each basic color component in the image data of the target image based on a transformation operation formula of each basic color component, the transformation operation formula of each basic color component is expressed as:

$$\text{Output\_}i = \text{Input\_}i * \text{ratio\_}Ti,$$

where Input_i represents the gray-scale value corresponding to each basic color component in the image data of the image to be processed, Output_i represents the gray-scale value corresponding to each basic color component in the image data of the target image, and i=1, 2, 3.

At least one embodiment of the present disclosure further provides an image processing device, comprising: a memory, for storing computer-readable instructions non-transitorily; and a processor, for running the computer-readable instructions. When the computer-readable instructions are run by the processor, the processor is caused to execute the image processing method provided by any embodiment of the present disclosure.

At least one embodiment of the present disclosure further provides a display device, comprising a display panel and the image processing device provided by any embodiment of the present disclosure, the image processing device is configured to process an image to be displayed to obtain a target image corresponding to the image to be displayed, and the display panel is configured to display the target image corresponding to the image to be displayed.

For example, in the display device provided by some embodiments of the present disclosure, the display device is configured to, in response to receiving an adjustment instruction, cause the image processing device to process the image to be displayed to obtain the target image corresponding to the image to be displayed, and cause the display panel to display the target image corresponding to the image to be displayed.

For example, in the display device provided by some embodiments of the present disclosure, the adjustment instruction comprises an adjustment parameter for determining the target color temperature.

For example, in the display device provided by some embodiments of the present disclosure, the display device is configured to, in response to not receiving the adjustment instruction, cause the image processing device not to process the image to be displayed and cause the display panel to display the image to be displayed.

At least one embodiment of the present disclosure further provides a storage medium storing computer-readable instructions non-transitorily. When the non-transitory computer-readable instructions are executed by a computer, instructions of the image processing method provided by any embodiment of the present disclosure can be executed.

BRIEF DESCRIPTION OF THE DRAWINGS

In order to more clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1A:
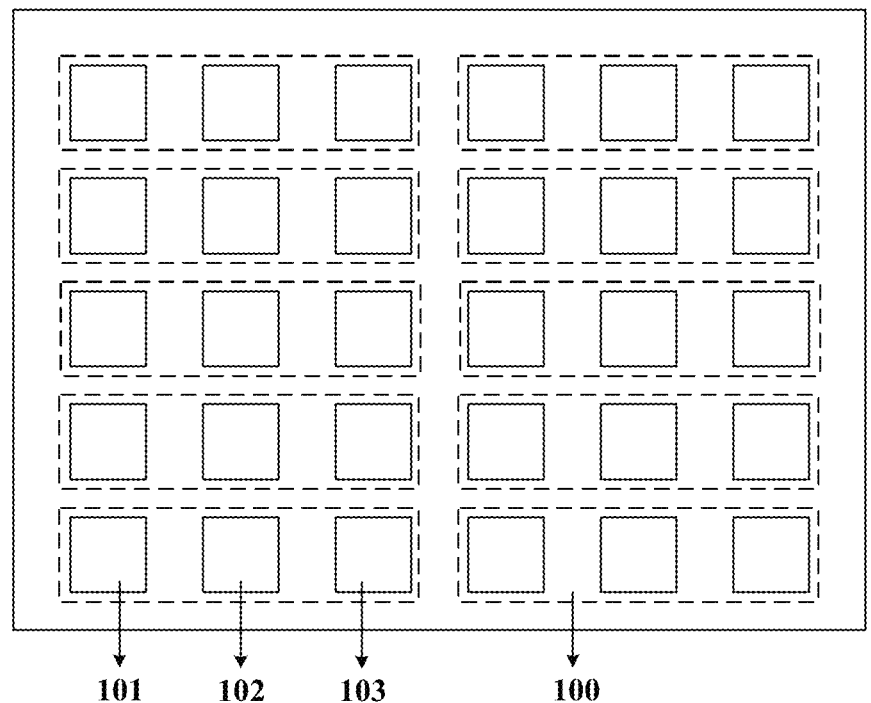
FIG. 1A is a schematic structural diagram of a display panel.

In order to make objects, technical solutions, and advantages of the embodiments of the present disclosure more apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the protection scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount, or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The present disclosure will be described below by several specific embodiments. In order to keep the following description of the embodiments of the present disclosure clear and concise, detailed descriptions of known functions and known components can be omitted. When any component of the embodiments of the present disclosure appears in more than one drawing, the component is indicated by the same or similar reference numerals in each drawing.

FIG. 1A is a schematic structural diagram of a display panel. As shown in FIG. 1A, the display panel 10 includes a plurality of pixel units 100 (as shown by dashed-line boxes in FIG. 1A) arranged in an array. For example, each pixel unit 100 may include a plurality of sub-pixel units, such as a red sub-pixel unit 101, a green sub-pixel unit 102, a blue sub-pixel unit 103, and the like shown in FIG. 1A, so that color display can be achieved. For example, each sub-pixel unit includes a pixel driving circuit and a light-emitting diode (LED), and the pixel driving circuit drives the light-emitting diode to emit light according to a received gray-scale voltage signal. For example, the light-emitting diode includes, but is not limited to, an organic light-emitting diode (OLED), a quantum dot light-emitting diode (QLED), an inorganic light-emitting diodes, etc.

For example, a frame of image to be displayed includes a plurality of pixels, the plurality of pixels are respectively displayed by the plurality of pixel units 100 on the display panel 10. The image data of the frame of image to be displayed includes image data of each pixel, and the image data of each pixel includes a gray-scale value corresponding to each basic color component of a plurality of basic color components, such as a gray-scale value of a red component, a gray-scale value of a green component, a gray-scale value of a blue component, and the like. Therefore, the respective pixel units 100 on the display panel 10 can correspondingly display according to the image data of the respective pixels of the frame of image to be displayed, so as to display the frame of image to be displayed on the display panel. For example, specifically, the red sub-pixel unit 101 in each pixel unit 100 displays according to the gray-scale value of the red component in the corresponding image pixel (the luminous brightness is positively correlated with the gray-scale value), the green sub-pixel unit 102 in each pixel unit 100 displays according to the gray-scale value of the green component in the corresponding image pixel (the luminous brightness is positively correlated with the gray-scale value), and the blue sub-pixel unit 103 in each pixel unit 100 displays according to the gray-scale value of the blue component in the corresponding image pixel (the luminous brightness is positively correlated with the gray-scale value), so that the lights of different colors emitted by the plurality of sub-pixel units in each pixel unit 100 are mixed with each other to generate a required color, and each pixel unit 100 can display the corresponding image pixel.

Figure 1B:
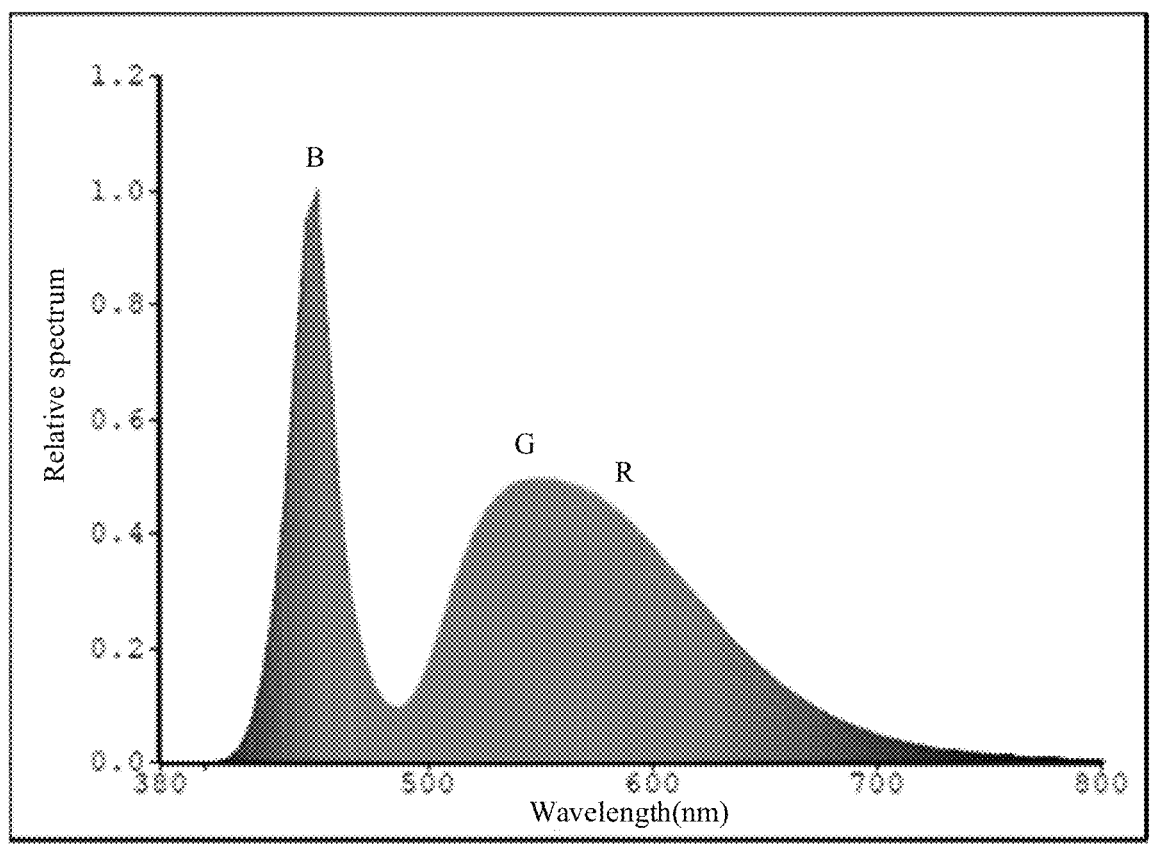
FIG. 1B is a schematic diagram of light source components of a display panel.

FIG. 1B is a schematic diagram of light source components of a display panel. As shown in FIG. 1A and FIG. 1B, when the display panel 10 displays, the red sub-pixel unit 101 can emit red light (R), the green sub-pixel unit 102 can emit green light, and the blue sub-pixel unit 103 can emit blue light (B). Generally speaking, the blue light (G) has the shortest spectrum and the strongest penetration, and the blue light is essential to obtain clear and bright images. However, the blue light with a wavelength of about 400-450 nm is relatively harmful to human eyes, and staring at the screen for a long time will cause damage to the retina, thereby leading to a series of vision problems.

Figure 1C:
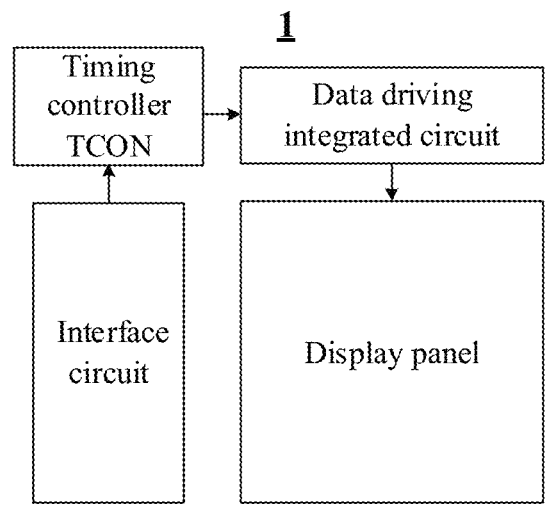
FIG. 1C is a schematic diagram of a display device.

FIG. 1C is a schematic diagram of a display device. As shown in FIG. 1C, the display device 1 includes a display panel. For example, the display panel may be the display panel 10 shown in FIG. 1A, but the embodiments of the present disclosure are not limited thereto. The display device 1 may also include an interface circuit, a timing controller TCON, and a data driving integrated circuit. It should be noted that the display device 100 is exemplary. For the sake of clarity and conciseness, FIG. 1C does not show all the constituent structures, units, or modules of the display device 100. For example, the display device can be a smart device, such as a mobile phone and a tablet computer, etc.

For example, in order to display, the display device 1 acquires image data from a data source through the interface circuit, converts the acquired image data into a data signal (i.e., a gray-scale signal, a value of the gray-scale signal is the gray-scale value) suitable for the data driving integrated circuit through the timing controller (TCON), performs digital-to-analog conversion on the converted data signal (i.e., the gray-scale signal) to obtain a corresponding analog voltage signal through the data driving integrated circuit, and inputs the analog voltage signal into the pixel unit of the display panel to control the pixel driving circuit to drive the light-emitting element to emit light.

In order to reduce the harm of the blue light radiation of the display device, various anti-blue-light products have appeared in the market, the anti-blue-light products are mainly divided into an anti-blue-light hardware and an anti-blue-light software. The anti-blue-light hardware mainly includes anti-blue-light glasses made of an anti-blue-light material and an anti-blue-light film (for example, attached to the display screen of the smart devices), etc. Although the anti-blue-light hardware can filter the blue light to protect eyes, the anti-blue-light hardware also has various shortcomings. For example, the anti-blue-light glasses will increase users' consumption expenditure, and the wearing comfort of the anti-blue-light glasses will directly affect users' viewing experience when using the smart devices. For example, the anti-blue-light film will increase the hardware cost (such as the cost of the display screen), and the touch sensitivity of the touch screen may be affected after the anti-blue-light film is attached to the touch screen. The anti-blue-light software includes an eye protection software. For example, the eye protection software can protect the eyes by adjusting the amount of the blue light emitted by the screen. The anti-blue-light software also includes an eye protection mode (including an anti-blue-light mode, a night mode, etc.) provided by an operating system of the smart device itself or various applications on the smart device (such as readers and browsers, etc.). For example, the eye protection mode can globally adjust (adjust the different color components) the color of the displayed image, thereby reducing the blue light radiation to achieve the function of protecting eyes.

Generally, the light seen by the human eyes is composed of the spectrum of seven colors of light composed of three primary colors of light (red, green, blue, RGB). The color temperature is specifically used to measure the color components of the light. When the blackbody is heated continuously, the maximum of the blackbody's relative spectrum power distribution will shift to a short wave direction.

Figure 2:
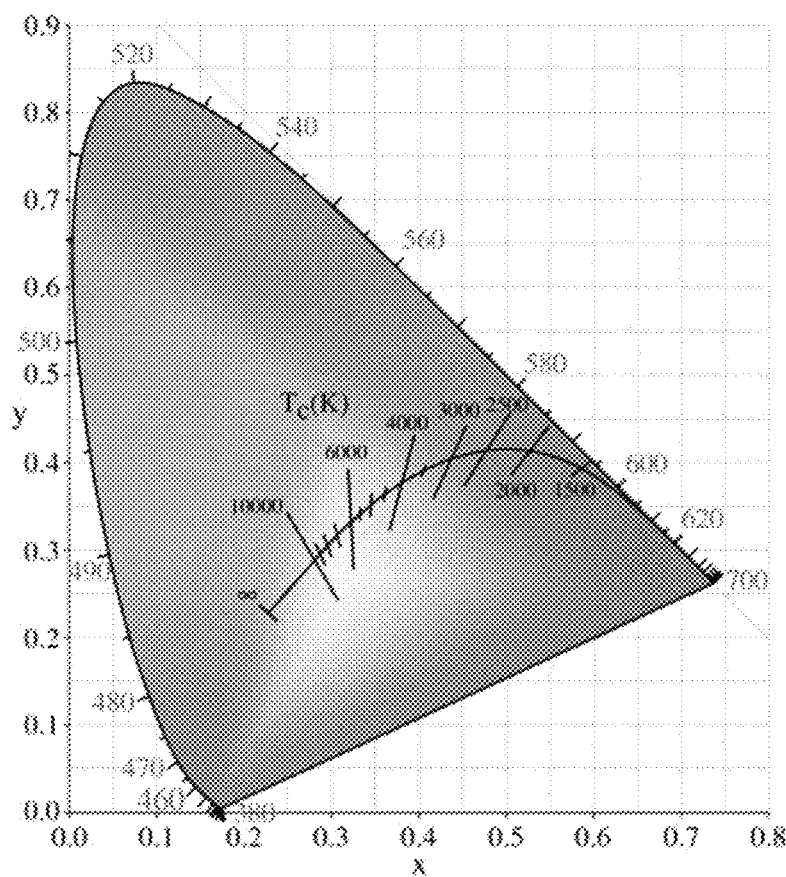
FIG. 2 is a schematic diagram of a chromaticity diagram.

FIG. 2 is a schematic diagram of a chromaticity diagram (referring to the chromaticity diagram made by the International Commission on Luminous Illumination (CIE)). As shown in FIG. 2, as the temperature rises, the blackbody color moves on the chromaticity diagram, forming a curve trajectory. This trajectory starts from a red region in a lower right corner, passes through a yellow region, a white region in the middle, and reaches a blue region on the left. The curve trajectory is called Planckian locus or blackbody locus.

For example, the color of the light source can be expressed by the colors of different colored lights emitted by the blackbody when heated to different temperatures. For example, the temperature of the blackbody, when the color of a certain light source is exactly the same as the color of the blackbody at a certain temperature, is usually called the color temperature of the light source, and the unit of the color temperature is Kelvin (k). For example, each pixel unit 100 including the red sub-pixel unit 101, the green sub-pixel unit 102, and the blue sub-pixel unit 103 in the display panel 10 shown in FIG. 1A can be used as a light source.

Figure 3:
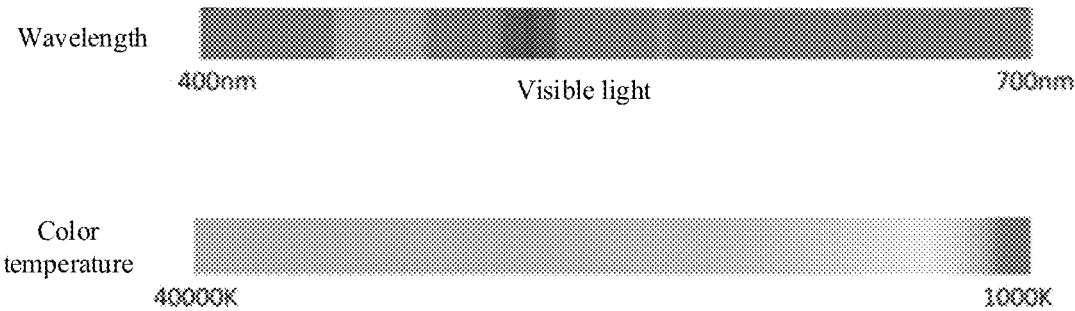
FIG. 3 is a schematic diagram of a corresponding relationship between a wavelength and a color temperature of light.

FIG. 3 is a schematic diagram of a corresponding relationship between a wavelength and a color temperature of light. As shown in FIG. 3, the wavelength determines the color of the light. For example, as shown in FIG. 3, the higher the color temperature value, the more the color shown by the light tends to be white-blue (the colder the hue), that is, the more the wavelength of the light tends to be 400 nm; the lower the color temperature, the more the color shown by the light tends to yellow-red (the warmer the hue), that is, the more the wavelength of the light tends to 700 nm.

In the research, the inventor of the present disclosure noticed that selecting the appropriate target color temperature with reference to the Planckian locus on the chromaticity diagram and performing scaling transformation on the gray-scale values of the three basic color components of the image, namely red, green, and blue, based on the target color temperature (for example, determining the attenuation ratio of the gray-scale value of each color component based on the target color temperature and performing scaling transformation on the gray-scale value of each color component according to the attenuation ratio) can not only achieve the anti-blue-light effect, but also maintain a good image visual effect.

At least one embodiment of the present disclosure provides an image processing method. The image processing method is suitable for processing an image to be processed to obtain a target image, image data of the image to be processed comprises a gray-scale value corresponding to each basic color component of a plurality of basic color components. The image processing method comprises: determining a target color temperature; determining a target value of each basic color component corresponding to the target color temperature; determining a transformation parameter of each basic color component according to the target value of each basic color component; and based on the transformation parameter of each basic color component, performing a transformation operation on the gray-scale value, corresponding to each basic color component, in the image data of the image to be processed to obtain image data of the target image.

Some embodiments of the present disclosure also provide an image processing device, a display device, and a storage medium corresponding to the above image processing method.

The image processing method provided by the embodiments of the present disclosure can adjust the gray-scale values of various basic color components of the image simultaneously according to the target color temperature, so that the color temperature of the image can be quickly adjusted while maintaining a good image visual effect. In addition, the image processing method can be applied to an eye protection mode of a software, and has the advantages of simplicity and low cost.

Some embodiments and examples of the present disclosure will be described in detail below with reference to the accompanying drawings.

Figure 4:
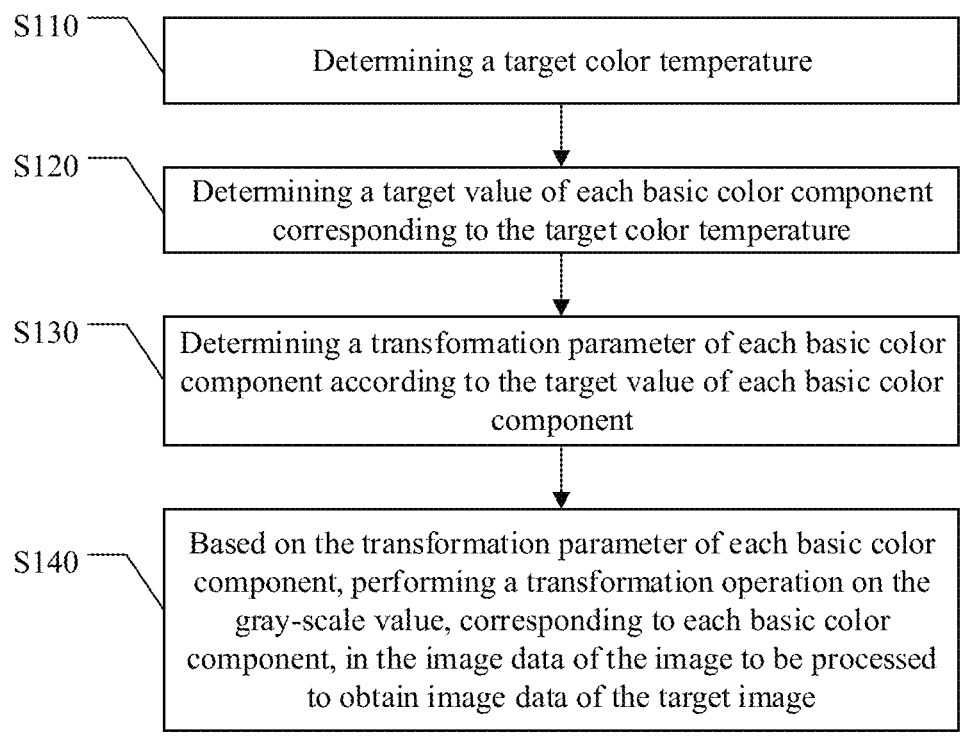
FIG. 4 is a flowchart of an image processing method provided by some embodiments of the present disclosure.

FIG. 4 is a flowchart of an image processing method provided by some embodiments of the present disclosure. For example, the image processing method can be applied to a display device (for example, the display device as shown in FIG. 1C). For example, the image processing method is suitable for processing the image to be processed (for example, the aforementioned image to be displayed) to obtain the target image. For example, the image data of the image to be processed includes a gray-scale value corresponding to each of a plurality of basic color components.

For example, in some examples, the above-mentioned basic color components include three basic color components, for example, the three basic color components include a red component (red, R), a green component (green, G), and a blue component (blue, B), and the embodiments of the present disclosure include but are not limited to this case. It should be noted that, although the embodiments of the present disclosure are described by taking the case that the three basic color components comprise red, green, and blue as an example, this case should not be regarded as limitations of the present disclosure.

For example, in some examples, the gray-scale signal of each basic color component can be an 8-bit digital signal, in this case, a range of the gray-scale value of each basic color component is [0, 255]; for example, in other examples, the gray-scale signal of each basic color component can be a 12-bit digital signal, in this case, a range of the gray-scale value of each basic color component is [0, 4095]. It should be understood that the embodiments of the present disclosure do not limit the number of bits of the gray-scale signal of each basic color component, that is, do not limit the value range of the gray-scale value of each basic color component. It should be noted that, although the embodiments of the present disclosure are described by taking the example that the range of the gray-scale value of each basic color component is [0, 255], it does not constitute a limitation to the present disclosure. It should be understood that 255 in the embodiment of the present disclosure can be replaced with the maximum value in the range of the gray-scale value actually adopted according to actual needs.

As shown in FIG. 4, the image processing method includes steps S110 to S140.

S110: determining a target color temperature.

For example, in some embodiments, a color temperature within a predetermined color temperature range can be selected as the target color temperature.

Figure 5:
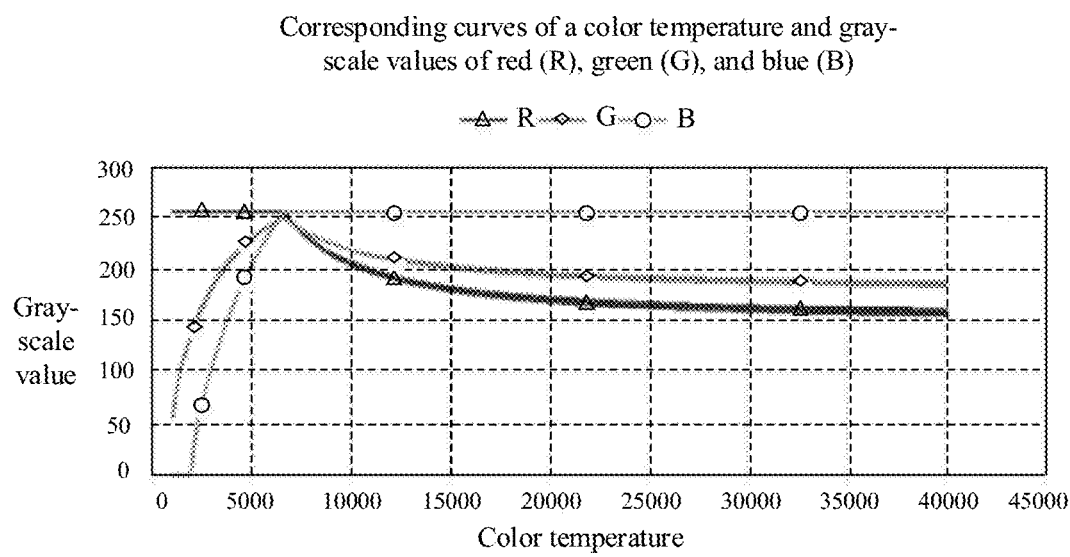
FIG. 5 is a schematic diagram of corresponding curves of a color temperature and gray-scale values of three basic color components of red, green, and blue, respectively.

FIG. 5 is a schematic diagram of corresponding curves of a color temperature and gray-scale values of three basic color components of red, green, and blue, respectively. For example, according to the standard observer Color Matching Functions (CMF s) defined by CIE in 1964 at a 10 degree viewing angle, the schematic diagram of the corresponding curves of the color temperature and the gray-scale values of three basic color components of red, green, and blue as shown in FIG. 5 can be obtained. It should be understood that each curve in FIG. 5 is actually a polygonal line segment obtained by connecting a plurality of coordinate points in sequence.

As shown in FIG. 5, in the range 1000-40000K of the color temperature, the gray-scale values of the three basic color components of red, green, and blue have their own attributes. When the color temperature is lower than 6600K, the red gray-scale value is always 255, while when the color temperature is higher than 6600K, the red gray-scale value decreases monotonously. When the color temperature is lower than 1900K, the blue gray-scale value is 0; when the color temperature is higher than 6600K, the blue gray-scale value is 255. When the color temperature is lower than 6600K, the green gray-scale increases monotonously, while when the color temperature is higher than 660 K, the green gray-scale decreases monotonously. It should be noted that the value range [0, 255] of the gray-scale value shown in FIG. 5 is exemplary. That is to say, the value range of the gray-scale value shown in FIG. 5 can also be set to other commonly used value ranges, for example, including but not limited to [0, 4095], etc., in this case, the corresponding curves of the color temperature and the gray-scale values of the three basic color components of red, green, and blue are basically the same as the corresponding curves as shown in FIG. 5 (only the gray-scale values (i.e., the vertical ordinate) have changed in scale).

For example, in some embodiments, a predetermined color temperature range is [Tc_min, Tc_max], where Tc_min is a first basic color temperature (that is, the minimum value in the predetermined color temperature range), Tc_max is a second basic color temperature (that is, the maximum value in the predetermined color temperature range), and the first basic color temperature is lower than the second basic color temperature. For example, in some examples, in order to achieve the function of eye protection, the first basic color temperature Tc_max can be made smaller than 6600k; at the same time, considering the maintenance of visual effect (the color temperature being too low will lead to a reddish visual effect, which is not conducive to viewing), the first basic color temperature Tc_min can be made greater than 1900K. Therefore, the first basic color temperature Tc_min and the second basic color temperature Tc_max satisfy: 1900K<Tc_min<Tc_max<6600K.

For example, in some examples, the value range of the first basic color temperature Tc_min is [2000K, 2500K], and the embodiments of the present disclosure include but are not limited to this case. For example, in some examples, the value range of the second basic color temperature Tc_max is [5000K, 6500K], and the embodiments of the present disclosure include but are not limited to this case.

For example, in some embodiments, determining the target color temperature, namely the step S110, may include the following steps S111 to S112.

S111: acquiring an adjustment parameter.

S112: determining the target color temperature according to the adjustment parameter.

For example, in some embodiments, a value range of the adjustment parameter is [0, 1], so that different users' preferences for different color temperatures can be taken into account (the user can choose the color temperature that the user like by adjusting the adjustment parameter). For example, in practical application, the user can select the adjustment parameter by operating a graphic control element on the display device, and the display device itself can obtain the adjustment parameter selected by the user and execute the image processing method provided by the embodiment of the present disclosure.

For example, in some embodiments, the target color temperature may be calculated based on a color temperature determination formula. For example, the color temperature determination formula can be expressed as:

$$\text{Temp}=Tc\_min+(Tc\_max-Tc\_min)*\text{ratio},$$

where Temp represents the target color temperature, ratio represents the adjustment parameter, Tc_min represents the first basic color temperature and Tc_max represents the second basic color temperature.

It should be noted that in some embodiments, the user can also directly select the target color temperature by operating the graphic control element on the display device, and the display device itself can obtain the target color temperature selected by the user and execute the image processing method provided by the embodiment of the present disclosure. That is, in the image processing method provided by the embodiment of the present disclosure, the target color temperature can also be directly obtained.

S120: determining a target value of each basic color component corresponding to the target color temperature.

For example, in some embodiments, the target value of each basic color component corresponding to the target color temperature can be determined according to a functional relation between each basic color component and the color temperature. For example, the functional relation between each basic color component and the color temperature is:

$$Fi(x)=Ai*\log(x/100+Bi)+Ci,$$

where, Fi(x) represents a value of each basic color component, x represents the color temperature, and values of parameters Ai, Bi, and Ci are obtained by fitting a plurality of coordinate points (referring to a curve segment between Tc_min and Tc_max of each curve as shown in FIG. 5), between the first basic color temperature Tc_min and the second basic color temperature Tc_max, of a color matching function of each basic color component by using the above functional relation, i=1 corresponds to the red component, i=2 corresponds to the green component, and i=3 corresponds to the blue component.

For example, in some embodiments, in order to simplify the fitting process and ensure a better fitting effect at the same time, the functional relation between each of the three basic color components of red, green, and blue and the color temperature can be appropriately modified.

For example, a first functional relation between the red component and the color temperature is:

$$F1(x)=A1*\log(x/100)+C1,$$

where F1(x) represents a value of the red component, x represents the color temperature, and values of parameters A1 and C1 are obtained by fitting a plurality of coordinate points, between the first basic color temperature Tc_min and the second basic color temperature Tc_max, of a color matching function of the red component by using the above first functional relation. In this case, it is equivalent to omitting the parameter B1 in the aforementioned functional relation.

For example, a second functional relation between the green component and the color temperature is:

$$F2(x)=A2*\log(x/100)+C2,$$

where F2(x) represents a value of the green component, x represents the color temperature, and values of parameters A2 and C2 are obtained by fitting a plurality of coordinate points, between the first basic color temperature Tc_min and the second basic color temperature Tc_max, of a color matching function of the green component by using the above second functional relation. In this case, it is equivalent to omitting the parameter B2 in the aforementioned functional relation.

For example, a third functional relation between the blue component and the color temperature is:

$$F3(x)=A3*\log(x/100-10)+C3,$$

where F3(x) represents a value of the blue component, x represents the color temperature, and values of parameters A3 and C3 are obtained by fitting a plurality of coordinate points, between the first basic color temperature Tc_min and the second basic color temperature Tc_max, of a color matching function of the blue component by using the above third functional relation. In this case, it is equivalent to directly determining the parameter B2 in the aforementioned functional relation to be −10.

It should be noted that in practical application, the above-mentioned first to third functional relations can be used to fit several coordinate points, between 1900K and 6600K, of the curves of red, green, and blue components shown in FIG. 5, respectively, so as to determine the values of the respective parameters in the first to third functional relations; and therefore, the first to third functional relations obtained can be applied in any predetermined color temperature range, as long as the first basic color temperature Tc_min and the second basic color temperature Tc_max in the predetermined color temperature range [Tc_min, Tc_max] satisfy 1900K<Tc_min<Tc_max<6600K.

For example, in a specific example, the first to third functional relations obtained by fitting are:

$$F1(x)=255,$$

$$F2(x)=90.674*\log(x/100)-124.93,$$

$$F3(x)=139.29*\log(x/100-10)-309.92.$$

Figure 6A:
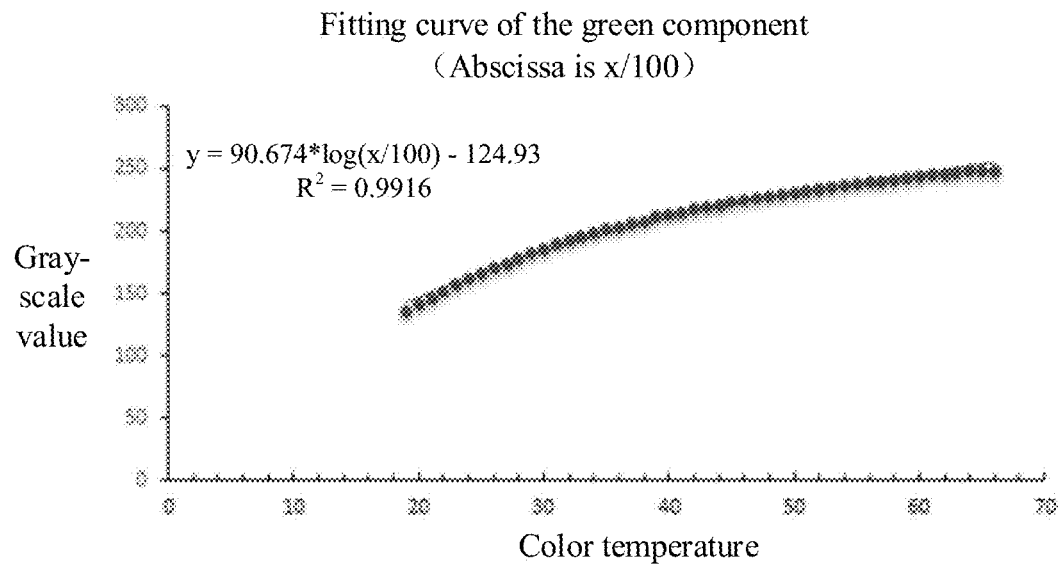
FIG. 6A is a schematic diagram of an effect of fitting a plurality of coordinate points, between 1900 K and 6600 K, of the curve of the green component as shown in FIG. 5 by using a second functional relation.
Figure 6B:
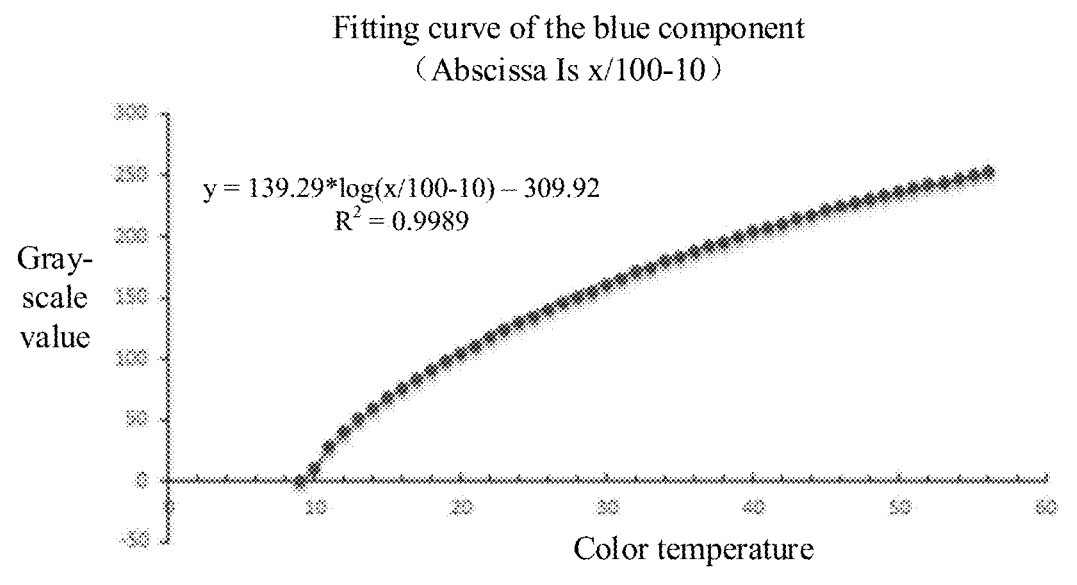
FIG. 6B is a schematic diagram of an effect of fitting a plurality of coordinate points, between 1900 K and 6600 K, of the curve of the blue component as shown in FIG. 5 by using a third functional relation.

For example, FIG. 6A shows a schematic diagram of an effect of fitting a plurality of coordinate points, between 1900 K and 6600 K, of the curve of the green component as shown in FIG. 5 by using the second functional relation, and FIG. 6B shows a schematic diagram of an effect of fitting a plurality of coordinate points, between 1900 K and 6600 K, of the curve of the blue component as shown in FIG. 5 by using the third functional relation. As shown in FIG. 6A and FIG. 6B, the determination coefficients R2 of the two fitting processes are 0.9916 and 0.9989, respectively, that is, the fitting effect is relatively good (the closer the value of R2 is to 1, the better the fitting effect is).

It should be understood that in some embodiments, in order to obtain a better fitting effect, a plurality of second functional relations (for example, two or more than two) can be used to perform piecewise fitting on a plurality of coordinate points, between 1900K and 6600K, of the color matching function of the green component, and at the same time, a plurality of third functional relations (for example, two or more than two) can also be used to perform piecewise fitting on a plurality of coordinate points, between 1900K and 6600K, of the color matching function of the green component. That is, at least one selected from a group consisting of the second functional relation and the third functional relation can be a piecewise function, and the embodiments of the present disclosure include but are not limited to this case.

For example, in order to ensure that the value obtained by substituting the target color temperature Temp into the above functional relation does not exceed the value range of the gray-scale values (for example, [0, 255]), the target value of each basic color component corresponding to the target color temperature Temp can be calculated based on a target value determination formula. For example, the target value determination formula can be expressed as:

$$Ti=\max(\min(Fi(\text{Temp}),G\max),0),$$

where Ti represents the target value of each basic color component corresponding to the target color temperature, Fi( ) represents the functional relation between each basic color component and the color temperature, i=1, 2, 3, Temp represents the target color temperature, G max represents a maximum value in a value range of the gray-scale value of each basic color component, min( ) represents a function that takes a minimum value, and max( ) represents a function that takes a maximum value. For example, in the case where the range of the gray-scale value of each basic color component is [0, 255], G max=255.

S130: determining a transformation parameter of each basic color component according to the target value of each basic color component.

For example, in some embodiments, the transformation parameter of each basic color component can be calculated based on a transformation parameter determination formula of each basic color component. For example, the transformation parameter determination formula of each basic color component can be expressed as:

$$\text{ratio\_}Ti = Ti/G\ \text{max},$$

where ratio_Ti represents the transformation parameter of each basic color component, and i=1, 2, 3.

For example, in the embodiments of the present disclosure, the transformation parameter ratio_T1 of the red component is usually 1, the transformation parameter ratio_T2 of the green component and the transformation parameter ratio_T3 of the blue component are usually less than 1, and the transformation parameter ratio_T3 of the blue component is usually less than the transformation parameter ratio_T2 of the green component.

S140: based on the transformation parameter of each basic color component, performing a transformation operation on the gray-scale value, corresponding to each basic color component, in the image data of the image to be processed to obtain image data of the target image.

For example, in some embodiments, the gray-scale value corresponding to each basic color component in the image data of the target image can be calculated based on a transformation operation formula of each basic color component. For example, the transformation operation formula of each basic color component can be expressed as:

$$\text{Output\_}i = \text{Input\_}i * \text{ratio\_}Ti,$$

where Input_i represents the gray-scale value corresponding to each basic color component in the image data of the image to be processed, and Output_i represents the gray-scale value corresponding to each basic color component in the image data of the target image, and i=1, 2, 3.

For example, because the transformation parameter ratio_T3 of the blue component is usually less than the transformation parameter ratio_T1 of the red component and the transformation parameter ratio_T2 of the green component, the gray-scale value of the blue component is attenuated the most after the scale transformation based on the above transformation operation formula, thus effectively reducing the blue light radiation.

Figure 7:
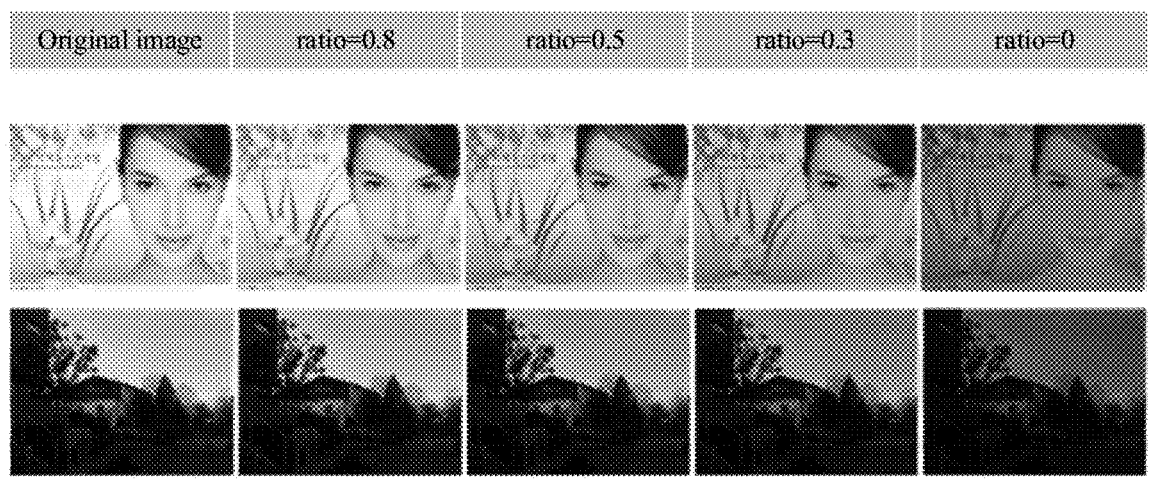
FIG. 7 is a schematic diagram of a processing effect of an image processing method provided by some embodiments of the present disclosure.

FIG. 7 is a schematic diagram of a processing effect of an image processing method provided by some embodiments of the present disclosure. As shown in FIG. 7, compared with an input image, the blue component in the target image (the images corresponding to ratio=0.8, 0.5, 0.3, and 0, respectively) is reduced, the hue of the target image is warmer, and the good image visual effect is maintained. In addition, as the adjustment parameter ratio decreases, the blue component in the target image gradually decreases and the hue gradually becomes warmer.

According to the image processing method provided by the embodiments of the present disclosure, the gray-scale values of various basic color components of the image can be simultaneously adjusted according to the target color temperature, so that the color temperature of the image can be quickly adjusted while maintaining a good image visual effect. In addition, the image processing method can be applied to the eye protection mode of the software, and has the advantages of simplicity and low cost.

Figure 8:
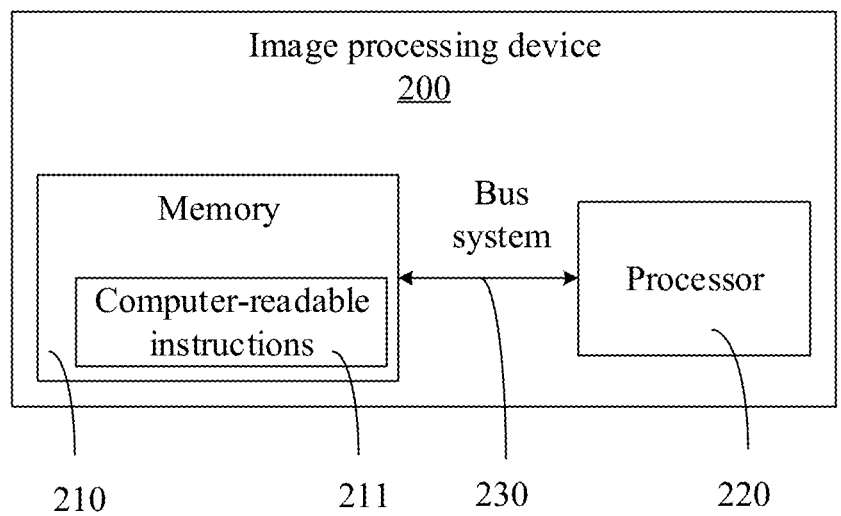
FIG. 8 is a schematic diagram of an image processing device provided by some embodiments of the present disclosure.

At least one embodiment of the present disclosure also provides an image processing device. FIG. 8 is a schematic diagram of an image processing device provided by some embodiments of the present disclosure. As shown in FIG. 8, the image processing device 200 includes a memory 210 and a processor 220. The memory 210 is used to store computer-readable instructions 211 non-transitorily, and the processor 220 is used to run the computer-readable instructions 211, when the computer-readable instructions are run by the processor 220, the image processing method provided by the embodiments of the present disclosure is executed.

For example, the memory 210 and the processor 220 are connected through a bus system 230. For example, one or more computer-readable instructions 211 are stored in the memory 210. For example, one or more computer-readable instructions 211 include instructions for executing the image processing method provided by any embodiment of the present disclosure. For example, one or more computer-readable instructions 211 may be executed by the processor 220. For example, the bus system 230 can be a common serial or parallel communication bus, or the like, which is not limited by the embodiments of the present disclosure.

For example, the processor 220 can be a central processing unit (CPU), a tensor processor (TPU), a field programmable gate array (FPGA), or other forms of processing units with a data processing capability and/or an instruction execution capability, can be a general-purpose processor or a special-purpose processor, and can control other components in the image processing device 200 to perform desired functions.

For example, the memory 210 may include one or more computer program products, the computer program products may include various forms of computer-readable storage media, such as a volatile memory and/or a nonvolatile memory. The volatile memory may include, for example, a random access memory (RAM) and/or a cache, and the like. The nonvolatile memory may include, for example, a read-only memory (ROM), a hard disk, a flash memory, etc. One or more computer-readable instructions can be stored on the computer-readable storage medium, and the processor 220 can run the program instructions to implement the functions (implemented by the processor 220) in the embodiments of the present disclosure and/or other desired functions, such as image processing functions, etc. Various application programs and various data can also be stored in the computer-readable storage medium, such as the aforementioned color temperature determination formula, the first to third functional relations, and the target value determination formula, etc.

For example, for a detailed description of the processing procedure of the image processing method, reference may be made to the related descriptions in the above-mentioned embodiments of the image processing method, and the repetitions will not be repeated herein again.

It should be noted that the image processing device 200 provided by the above-mentioned embodiments of the present disclosure is exemplary, but is not restrictive. According to the actual application needs, the image processing device may also include other conventional components or structures. For example, in order to achieve the necessary functions of the image processing device, a person skilled in the art may set other conventional components or structures according to specific application scenarios, and the embodiments of the present disclosure do not limit this.

For the technical effects of the image processing device provided by the above-mentioned embodiments of the present disclosure, reference may be made to the corresponding descriptions of the image processing method in the above-mentioned embodiments, and the repetitions will not be repeated herein again.

Figure 9:
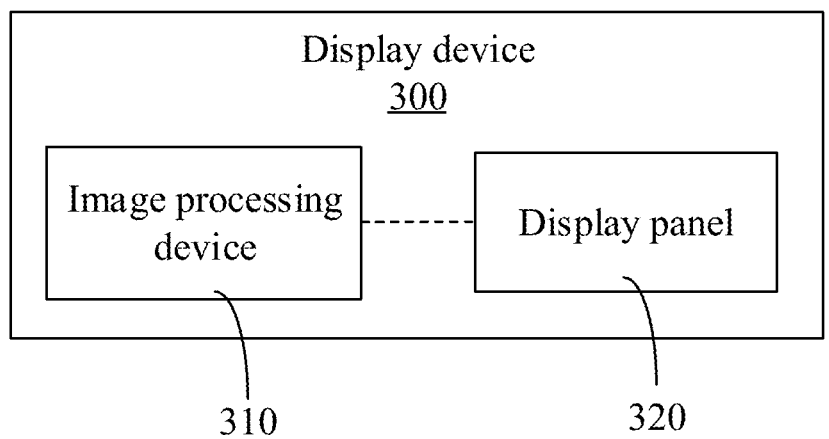
FIG. 9 is a schematic diagram of a display device provided by some embodiments of the present disclosure.

At least one embodiment of the present disclosure also provides a display device. FIG. 9 is a schematic diagram of a display device provided by some embodiments of the present disclosure. As shown in FIG. 9, the display device 300 includes an image processing device 310 and a display panel 320.

For example, the image processing device 310 is configured to process an image to be displayed (taking the image to be displayed as the image to be processed in the image processing method) by using the image processing method provided by the embodiment of the present disclosure to obtain a target image corresponding to the image to be displayed. For example, the image processing device 310 can be the image processing device 200 shown in FIG. 8, and the embodiments of the present disclosure include but are not limited to this case.

For example, the display panel 320 is configured to display the image to be displayed or display the target image corresponding to the image to be displayed. For example, the display panel 320 may be the display panel shown in FIG. 1A, and the embodiments of the present disclosure include but are not limited to this case.

For example, the display device 300 may also include an input interface that allows external devices to communicate with the display device 300. For example, the input interface can be used to receive instructions from an external computer device, or from a user, or the like. The display device 300 may also include an output interface for interconnecting the display device 300 and one or more external devices. For example, the display device 300 can output the image data of the target image corresponding to the image to be displayed through the output interface. External devices that communicate with the display device 300 through the input interface and the output interface can be included in an environment that provides any type of user interface with which the user can interact. Examples of the type of the user interface include a graphical user interface, a natural user interface, etc. For example, the graphical user interface can accept input from a user by using the input device, such as a keyboard, a mouse, a remote controller, etc., and provide output on the output device, such as a display. In addition, the natural user interface may enable the user to interact with the display device 300 in a manner that does not have constraints imposed by the input device, such as a keyboard, a mouse, a remote controller, etc. On the contrary, the natural user interface can rely on a speech recognition, a touch and stylus-pen recognition, a gesture recognition on and near the screen, an in-air gesture, a head and eye tracking, a speech and a speech, vision, touch, gesture, machine intelligence, and so on.

For example, in some embodiments, the display device 300 is configured to, in response to receiving an adjustment instruction, cause the image processing device 310 to process the image to be displayed to obtain the target image corresponding to the image to be displayed, and to cause the display panel 320 to display the target image corresponding to the image to be displayed. For example, the above adjustment instruction includes an adjustment parameter for determining the target color temperature.

Figure 10:
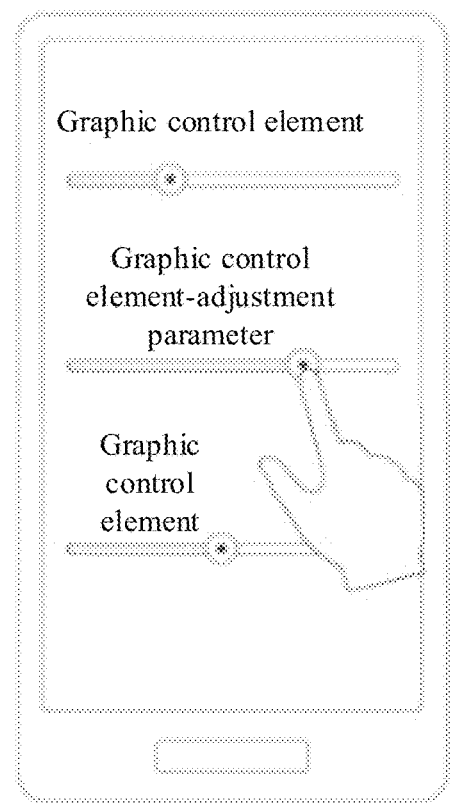
FIG. 10 is a schematic diagram of applying an adjustment instruction to a display device provided by some embodiments of the present disclosure.

FIG. 10 shows a schematic diagram of applying an adjustment instruction to a display device. As shown in FIG. 10, the display device can provide one or more graphic control elements, including, for example, a graphic control element for setting the adjustment parameter (as shown in "graphic control element-adjustment parameter" in FIG. 10). The user can operate the graphic control element ("graphic control element-adjustment parameter" as shown in FIG. 10) with a finger, for example, to apply an adjustment instruction to the display device, thereby setting the adjustment parameter ratio for determining the target color temperature.

For example, in some embodiments, as shown in FIG. 10, the user can directly set the size of the adjustment parameter ratio by sliding a slider in the graphic control element. It should be noted that in the embodiment of this disclosure, the smaller the adjustment parameter ratio, the greater the adjustment degree, which may be different from the adjustment habits of ordinary users. Therefore, in other embodiments, the user can indirectly set the size of the adjustment parameter ratio by sliding the slider in the graphic control element. For example, in some examples, the "graphic control element-adjustment parameter" can be defined as ratio_d, and the value range of the ratio_d is for example 0~100; the value of ratio_d is used to characterize the adjustment degree (that is, the larger the ratio_d, the greater the adjustment degree). In this case, when the user slides the slider in the graphic control element to set the ratio_d, the size of the adjustment parameter ratio can be determined by the formula ratio=1−ratio_d/100, which is more in line with the adjustment habits of the ordinary users. It should be noted that the embodiments of the present disclosure include but are not limited to this case.

For example, in some embodiments, the display device may also provide a switch control element (not shown in FIG. 10) for controlling whether to activate the above-mentioned graphic control element ("graphic control element-adjustment parameter" as shown in FIG. 10). For example, in some examples, when the user turns on the switch control element, an adjustment instruction is applied to the display device, and the display device can process the image to be displayed according to a preset adjustment parameter (the adjustment parameter preset by an operating system or various application programs of the display device, or the adjustment parameter set by the user when using at last time) and display the target image corresponding to the image to be displayed.

For example, in some embodiments, the display device 300 is further configured to, in response to not receiving the adjustment instruction, cause the image processing device 310 not to process the image to be displayed and cause the display panel 320 to display the image to be displayed.

For example, in some examples, when the user turns off the aforementioned switch control element or the switch control element is not turned on, the display device does not receive the adjustment instruction, and at this time, the display device does not process the image to be displayed and directly displays the image to be displayed.

For example, in other examples, the values of the transformation parameters ratio_Ti of various basic color components corresponding to the case where the adjustment parameter ratio=1 in the above-mentioned image processing method are all equal to 1; or, if at least one of the transformation parameters ratio_Ti of various basic color components corresponding to the case where the adjustment parameter ratio=1 in the above-mentioned image processing method is not equal to 1, the value of the transformation parameter ratio_Ti of each basic color component corresponding to the case where the adjustment parameter ratio=1 in the above-mentioned image processing method can be set to 1 (the value of the transformation parameter ratio_Ti of each basic color component corresponding to the case where the adjustment parameter ratio≠1 remains unchanged). In this case, it can be considered that when the user slides the slider in the graphic control element to the position where ratio_d=0, the display device does not receive the adjustment instruction. At this time, the display device does not process the image to be displayed and directly displays the image to be displayed. Accordingly, in this case, it can also be considered that when the user slides the slider in the graphic control electrode to the position of ratio_d≠0, the user applies an adjustment instruction to the display device, so that the size of the adjustment parameter ratio can be determined by the formula ratio=1−ratio_d/100 and a current position of the slider (that is, the current value of the ratio_d). Therefore, in this case, the aforementioned switch control element for controlling whether to activate the above-mentioned graphic control element ("graphic control element-adjustment parameter" as shown in FIG. 10) can be omitted.

It should be noted that, for the sake of clarity and conciseness, the embodiment of the present disclosure does not provide all the constituent structures, units, or modules of the display device. In order to achieve the necessary functions of the display device, those skilled in the art can provide and set other unillustrated constituent structures, units, or modules (for example, the interface circuit, the timing controller, and the data driving integrated circuit in the display device 1 shown in FIG. 1C, etc.) according to specific needs, and the embodiments of the present disclosure do not limit this.

It should be noted that the display device provided by the embodiments of the present disclosure can be any products or components with a color display function, such as a display, a television, a mobile phone, a tablet computer, a notebook computer, etc. It should be noted that the display device can also include other conventional components or structures. For example, in order to achieve the necessary functions of the display device, those skilled in the field can set other conventional components or structures according to the specific application scenarios, and the embodiments of the present disclosure do not limit this.

For the technical effects of the display device provided by the embodiments of the present disclosure, reference may be made to the corresponding descriptions of the image processing method in the above embodiments, and the repetitions will not be repeated herein again.

Figure 11:
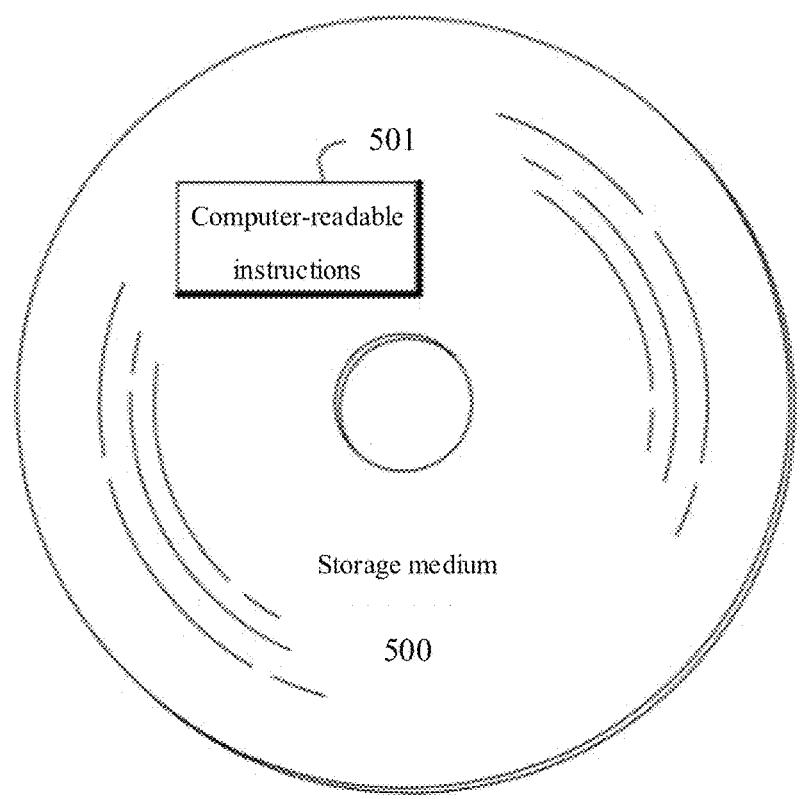
FIG. 11 is a schematic diagram of a storage medium provided by some embodiments of the present disclosure.

At least one embodiment of the present disclosure also provides a storage medium. FIG. 11 is a schematic diagram of a storage medium provided by some embodiments of the present disclosure. For example, the storage medium 500 stores computer-readable instructions 501 non-transitorily, and when the non-transitory computer-readable instructions 501 are executed by a computer (including a processor), the image processing method provided by any embodiment of the present disclosure can be executed.

For example, the storage medium can be any combination of one or more computer-readable storage media, for example, one computer-readable storage medium includes the program codes and data of the aforementioned color temperature determination formula, the first to third functional relations, and the target value determination formula, for example, the another computer-readable storage medium includes the program codes for executing the image processing method shown in FIG. 4. For example, when the program codes are read by a computer, the computer can execute the program codes stored in the computer-readable storage medium to execute the image processing method shown in FIG. 4, thereby obtaining the image data of the target image.

For example, the storage medium may include a storage component of a tablet computer, a hard disk of a personal computer, a random access memory (RAM), a read-only memory (ROM), an erasable programmable read-only memory (EPROM), a compact disk read-only memory (CD-ROM), a flash memory, or any combination of the above storage media, or other suitable storage media.

For the technical effects of the storage medium provided by the embodiments of the present disclosure, reference may be made to the corresponding descriptions of the image processing method in the above-mentioned embodiments, the repetitions will not be repeated herein again.

For the present disclosure, the following statements should be noted:

(1) The accompanying drawings of the embodiment(s) of the present disclosure involve only the structure(s) in connection with the embodiment(s) of the present disclosure, and other structure(s) can refer to common design(s).

(2) In case of no conflict, the embodiments of the present disclosure and the features in the embodiment(s) can be combined with each other to obtain new embodiment(s).

What are described above are only exemplary implementations of the present disclosure only and are not intended to limit the protection scope of the present disclosure, within the disclosed technical scope of the disclosure, the modification and replacement, which any skilled who is familiar with the technical field may easily conceive, should be covered within the protection scope of the present disclosure. Therefore, the protection scope of the present disclosure is determined by the accompanying claims.

What is claimed is:

1. An image processing method, suitable for processing an image to be processed to obtain a target image, wherein image data of the image to be processed comprises a gray-scale value corresponding to each basic color component of a plurality of basic color components, and
the image processing method comprises:
determining a target color temperature;
determining a target value of each basic color component corresponding to the target color temperature;
determining a transformation parameter of each basic color component according to the target value of each basic color component; and
based on the transformation parameter of each basic color component, performing a transformation operation on the gray-scale value, corresponding to each basic color component, in the image data of the image to be processed to obtain image data of the target image.

2. The image processing method according to claim 1, wherein determining the target color temperature comprises:
acquiring an adjustment parameter; and
determining the target color temperature according to the adjustment parameter.

3. The image processing method according to claim 2, wherein a value range of the adjustment parameter is [0, 1].

4. The image processing method according to claim 3, wherein determining the target color temperature according to the adjustment parameter comprises:
calculating the target color temperature based on a color temperature determination formula,
wherein the color temperature determination formula is expressed as:

$$Temp = Tc\_min + (Tc\_max - Tc\_min) * ratio,$$

wherein Temp represents the target color temperature, ratio represents the adjustment parameter, Tc_min represents a first basic color temperature, Tc_max represents a second basic color temperature, and the first basic color temperature is lower than the second basic color temperature.

5. The image processing method according to claim 4, wherein the first basic color temperature Tc_min and the second basic color temperature Tc_max satisfy:

$$1900K < Tc\_min < Tc\_max < 6600K.$$

6. The image processing method according to claim 5, wherein a value range of the first basic color temperature Tc_min is [2000K, 2500K], and a value range of the second basic color temperature Tc_max is [5000K, 6500K].

7. The image processing method according to claim 4, wherein the plurality of basic color components comprise three basic color components and the three basic color components comprise a red component, a green component, and a blue component.

8. The image processing method according to claim 7, wherein determining the target value of each basic color component corresponding to the target color temperature comprises:
   determining the target value of each basic color component corresponding to the target color temperature according to a functional relation between each basic color component and a color temperature,
   wherein the functional relation between each basic color component and the color temperature is:

$$Fi(x)=Ai*\log((x/100)+Bi)+Ci,$$

wherein Fi(x) represents a value of each basic color component, x represents the color temperature, and values of parameters Ai, Bi, and Ci are obtained by fitting a plurality of coordinate points, between the first basic color temperature Tc_min and the second basic color temperature Tc_max, of a color matching function of each basic color component by using the functional relation, i=1 corresponds to the red component, i=2 corresponds to the green component, and i=3 corresponds to the blue component.

9. The image processing method according to claim 7, wherein determining the target value of each basic color component corresponding to the target color temperature comprises:
   determining the target value of each basic color component corresponding to the target color temperature according to a functional relation between each basic color component and a color temperature, wherein
   in a case where each basic color component is the red component, the functional relation between the red component and the color temperature is a first functional relation, and the first functional relation is:

$$F1(x)=A1*\log(x/100)+C1,$$

wherein F1(x) represents a value of the red component, x represents the color temperature, and values of parameters A1 and C1 are obtained by fitting a plurality of coordinate points, between the first basic color temperature Tc_min and the second basic color temperature Tc_max, of a color matching function of the red component by using the first functional relation;
   in a case where each basic color component is the green component, the functional relation between the green component and the color temperature is a second a second functional relation, and the second functional relation is:

$$F2(x)=A2*\log(x/100)+C2,$$

wherein F2(x) represents a value of the green component, x represents the color temperature, and values of parameters A2 and C2 are obtained by fitting a plurality of coordinate points, between the first basic color temperature Tc_min and the second basic color temperature Tc_max, of a color matching function of the green component by using the second functional relation; and
   in a case where each basic color component is the blue component, the functional relation between the blue component and the color temperature is a third functional relation, and the third functional relation is:

$$F3(x)=A3*\log((x/100)-10)+C3,$$

wherein F3(x) represents a value of the blue component, x represents the color temperature, and values of parameters A3 and C3 are obtained by fitting a plurality of coordinate points, between the first basic color temperature Tc_min and the second basic color temperature Tc_max, of a color matching function of the blue component by using the third functional relation.

10. The image processing method according to claim 8, wherein determining the target value of each basic color component corresponding to the target color temperature according to the functional relation between each basic color component and the color temperature, comprises:
   calculating the target value of each basic color component corresponding to the target color temperature based on a target value determination formula, wherein the target value determination formula is expressed as:

$$Ti=\max(\min(Fi(Temp),G\max),0),$$

wherein Ti represents the target value of each basic color component corresponding to the target color temperature, Fi( ) represents the functional relation between each basic color component and the color temperature, i=1, 2, 3, Temp represents the target color temperature, Gmax represents a maximum value in a value range of the gray-scale value of each basic color component, min( ) represents a function that takes a minimum value, and max( ) represents a function that takes a maximum value.

11. The image processing method according to claim 10, wherein determining the transformation parameter of each basic color component according to the target value of each basic color component, comprises:
   calculating the transformation parameter of each basic color component based on a transformation parameter determination formula of each basic color component, wherein the transformation parameter determination formula of each basic color component is expressed as:

$$\mathrm{ratio}\_Ti=Ti/G\max,$$

wherein ratio_Ti represents the transformation parameter of each basic color component, and i=1, 2, 3.

12. The image processing method according to claim 11, wherein based on the transformation parameter of each basic color component, performing the transformation operation on the gray-scale value, corresponding to each basic color component, in the image data of the image to be processed to obtain the image data of the target image, comprises:
   calculating a gray-scale value corresponding to each basic color component in the image data of the target image based on a transformation operation formula of each basic color component, wherein the transformation operation formula of each basic color component is expressed as:

$$\mathrm{Output}\_i=\mathrm{Input}\_i*\mathrm{ratio}\_Ti,$$

wherein Input_i represents the gray-scale value corresponding to each basic color component in the image data of the image to be processed, Output_i represents the gray-scale value corresponding to each basic color component in the image data of the target image, and i=1, 2, 3.

13. The image processing method according to claim 9, wherein determining the target value of each basic color component corresponding to the target color temperature according to the functional relation between each basic color component and the color temperature, comprises:

calculating the target value of each basic color component corresponding to the target color temperature based on a target value determination formula, wherein the target value determination formula is expressed as:

$$Ti=\max(\min(Fi(Temp),Gmax),0),$$

wherein Ti represents the target value of each basic color component corresponding to the target color temperature, Fi( ) represents the functional relation between each basic color component and the color temperature, i=1, 2, 3, Temp represents the target color temperature, Gmax represents a maximum value in a value range of the gray-scale value of each basic color component, min( ) represents a function that takes a minimum value, and max( ) represents a function that takes a maximum value.

14. The image processing method according to claim 13, wherein determining the transformation parameter of each basic color component according to the target value of each basic color component, comprises:

calculating the transformation parameter of each basic color component based on a transformation parameter determination formula of each basic color component, wherein the transformation parameter determination formula of each basic color component is expressed as:

$$ratio\_Ti=Ti/Gmax,$$

wherein ratio_Ti represents the transformation parameter of each basic color component, and i=1, 2, 3.

15. An image processing device, comprising:
a memory, for storing computer-readable instructions non-transitorily; and
a processor, for running the computer-readable instructions,
wherein when the computer-readable instructions are run by the processor, the processor is caused to execute an image processing method,
the image processing method is suitable for processing an image to be processed to obtain a target image, image data of the image to be processed comprises a gray-scale value corresponding to each basic color component of a plurality of basic color components,
the image processing method comprises;
determining a target color temperature;
determining a target value of each basic color component corresponding to the target color temperature;
determining a transformation parameter of each basic color component according to the target value of each basic color component; and
based on the transformation parameter of each basic color component, performing a transformation operation on the gray-scale value, corresponding to each basic color component, in the image data of the image to be processed to obtain image data of the target image.

16. A display device, comprising a display panel and the image processing device according to claim 15,
wherein the image processing device is configured to process an image to be displayed to obtain a target image corresponding to the image to be displayed,
the display panel is configured to display the target image corresponding to the image to be displayed.

17. The display device according to claim 16, wherein the display device is configured to, in response to receiving an adjustment instruction, cause the image processing device to process the image to be displayed to obtain the target image corresponding to the image to be displayed, and cause the display panel to display the target image corresponding to the image to be displayed.

18. The display device according to claim 17, wherein the adjustment instruction comprises an adjustment parameter for determining the target color temperature.

19. The display device according to claim 17, wherein the display device is configured to, in response to not receiving the adjustment instruction, cause the image processing device not to process the image to be displayed and cause the display panel to display the image to be displayed.

20. A non-transitory computer-readable storage medium, storing non-transitory computer-readable instructions, wherein when the non-transitory computer-readable instructions are executed by a computer, the computer is caused to execute an image processing method,
the image processing method is suitable for processing an image to be processed to obtain a target image, image data of the image to be processed comprises a gray-scale value corresponding to each basic color component of a plurality of basic color components,
the image processing method comprises;
determining a target color temperature;
determining a target value of each basic color component corresponding to the target color temperature;
determining a transformation parameter of each basic color component according to the target value of each basic color component;
based on the transformation parameter of each basic color component, performing a transformation operation on the gray-scale value, corresponding to each basic color component, in the image data of the image to be processed to obtain image data of the target image.

* * * * *